(12) United States Patent
Hsu

(10) Patent No.: US 6,739,637 B2
(45) Date of Patent: *May 25, 2004

(54) GRIPPING DEVICE HAVING LENGTH ADJUSTING MECHANISM

(76) Inventor: Shih Hao Hsu, No. 426, Dou Yuan East Road, Bi Tou Hsiang, Chang Hua Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 10/252,166

(22) Filed: Sep. 23, 2002

(65) Prior Publication Data

US 2003/0020293 A1 Jan. 30, 2003

Related U.S. Application Data

(63) Continuation-in-part of application No. 09/912,665, filed on Jul. 25, 2001, now Pat. No. 6,520,556.

(51) Int. Cl.7 .................................................. B25J 1/00
(52) U.S. Cl. ...................................... 294/19.1; 294/115
(58) Field of Search ........................ 294/11, 19.1, 19.3, 294/22, 23, 50.8, 50.9, 111, 115; 403/109.1, 109.2, 109.7

(56) References Cited

U.S. PATENT DOCUMENTS

| 182,367 A | 9/1876 | Jones |
| 465,222 A | 12/1891 | Ulbricht |
| 923,376 A | 1/1909 | Savage |
| 919,731 A | 4/1909 | La May |
| 1,024,991 A | 4/1912 | Hunt |
| 1,051,374 A | 1/1913 | Agin |
| 3,317,997 A | 5/1967 | Hedstrom et al. |
| 4,483,562 A | 11/1984 | Schoolman ................ 294/19 R |
| 4,962,957 A | 10/1990 | Traber ........................ 294/19.1 |
| 6,520,556 B1 * | 2/2003 | Hsu ........................... 294/19.1 |

* cited by examiner

Primary Examiner—Dean J. Kramer

(57) ABSTRACT

A gripping device includes a hand grip rotatably secured to a handle, a tube secured to the handle, a tool member coupled to a pipe, a beam slidably received in the pipe and coupled to the tool member, a cable secured to the hand grip and coupled to a bar. The tube may be adjustably secured to the pipe. The bar may be detachably secured to the beam, for allowing the tube to be adjusted relative to the pipe when the bar is disengaged from the beam. A lever is pivotally secured to the tube and has a catch selectively engaging into the pipe for detachably securing the pipe to the tube.

17 Claims, 12 Drawing Sheets

GRIPPING DEVICE HAVING LENGTH ADJUSTING MECHANISM

The present invention is a continuation-in-part of U.S. patent application Ser. No. 09/912,665, filed Jul. 25, 2001, now U.S. Pat. No. 6,520,556.

BACKGROUND OF THE INVENTION

1. Field of the Invention

The present invention relates to a gripping device, and more particularly to a gripping device having an adjustable configuration for adjusting to different lengths.

2. Description of the Prior Art

Typical gripping devices comprise a pair of longitudinal or straight gripping fingers rotatably secured to a base, and a pair of handles also rotatably secured to the base and coupled to the gripping fingers for rotating or moving or actuating the gripping fingers to grasp or hold the objects.

Several of the typical gripping devices have been disclosed in U.S. Pat. No. 182,367 to Jones, U.S. Pat. No. 465,222 to Ulbricht, U.S. Pat. No. 919,731 to La May, U.S. Pat. No. 923,376 to Savage, U.S. Pat. No. 1,024,991 to Hunt, U.S. Pat. No. 1,051,374 to Agin, U.S. Pat. No. 4,483,562 to Schoolman, U.S. Pat. No. 4,962,957 to Traber.

A relative harder and unextendible rod or lever is required to be disposed in a longitudinal tube, and coupled to the griping fingers. The lever is required to be slidably received in the longitudinal tube and may not be adjusted to different lengths, such that the longitudinal tube also may not be adjusted to different lengths.

U.S. Pat. No. 3,317,997 to Hedstrom et al. discloses another typical gripping device including an inner tube slidably received in an outer tube and movably and adjustably secured to the outer tube, and a bar and one or more wire loops are required to be received in the tubes for actuating tool members. However, the bar and the wire loops may not be solidly secured or coupled together when the bar is moved or adjusted relative to the wire loops.

The present invention has arisen to mitigate and/or obviate the afore-described disadvantages of the conventional gripping devices.

SUMMARY OF THE INVENTION

The primary objective of the present invention is to provide a gripping device including an adjustable configuration for adjusting to different lengths and for gripping or grasping the objects in deep holes.

The other objective of the present invention is to provide a gripping device including an adjustable configuration for easily and quickly and adjustably coupling the handles to the tool members for operating the tool members.

In accordance with one aspect of the invention, there is provided a gripping device comprising a handle body, a hand grip rotatably secured to the handle body with a shaft, and rotatable toward and away from the handle body about the shaft, a tube secured to the handle body, a pipe, a tool member coupled to the pipe, a beam slidably received in the pipe, and coupled to the tool member, a cable secured to the hand grip, a bar coupled to the cable, means for adjustably securing the tube to the pipe, and means for detachably securing the bar and the cable to the beam and the tool member.

The beam includes at least one tooth provided thereon, the bar includes at least one tooth provided thereon for selectively engaging with the tooth of the beam and for detachably securing the bar to the beam.

The tool member includes a base secured to the pipe, a pair of gripping fingers pivotally secured to the base and rotatable toward and away from each other, and means for coupling the gripping fingers to the beam.

The coupling means includes a follower slidably received in the base and secured to the beam, and a pair of links pivotally coupling the follower to the gripping fingers respectively.

A device may further be provided for locking the hand grip to the handle body to prevent the hand grip from rotating away from the handle body when the gripping fingers grasp the object.

The tube includes a first end, the pipe includes a first end to be detachably secured to the first end of the tube, the adjustably securing means includes a barrel secured to the first end of the tube, and means for catching the barrel to the pipe.

The catching means includes a lever pivotally secured to the barrel, and including a catch extended therefrom for selectively engaging through the barrel and the pipe. The catch is engageable through the cavity of the pipe, and engageable with the bar, for selectively forcing the bar toward and to engage with the beam.

The pipe includes a plurality of cavities formed therein, the barrel includes an orifice formed therein, the catch of the lever is engaged through the orifice of the barrel, and selectively engaging into either of the cavities of the pipe.

A spring biasing device may further be provided for biasing the catch to engage into the pipe and to engage with the bar.

The lever includes at least one projection provided thereon and engageable with the pipe, for positioning the lever to the pipe.

A device may further be provided for guiding the bar to move toward and away from the beam and includes at least one stop received in the pipe and having at least one jut extended therefrom, at least one board secured to the bar and having at least one track provided therein for slidably receiving the jut, and for slidably guiding the board and the bar to move relative to the pipe and the beam.

A spring biasing device may further be provided for biasing the bar away from the beam.

The pipe includes at least one swelling provided thereon, and a cap attached to the pipe and having at least one recess formed therein for receiving the swelling and for preventing the cap from rotating relative to the pipe.

The cap includes a channel formed therein for slidably receiving the beam and for guiding the beam to move relative to the pipe and for preventing the beam from rotating relative to the pipe.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
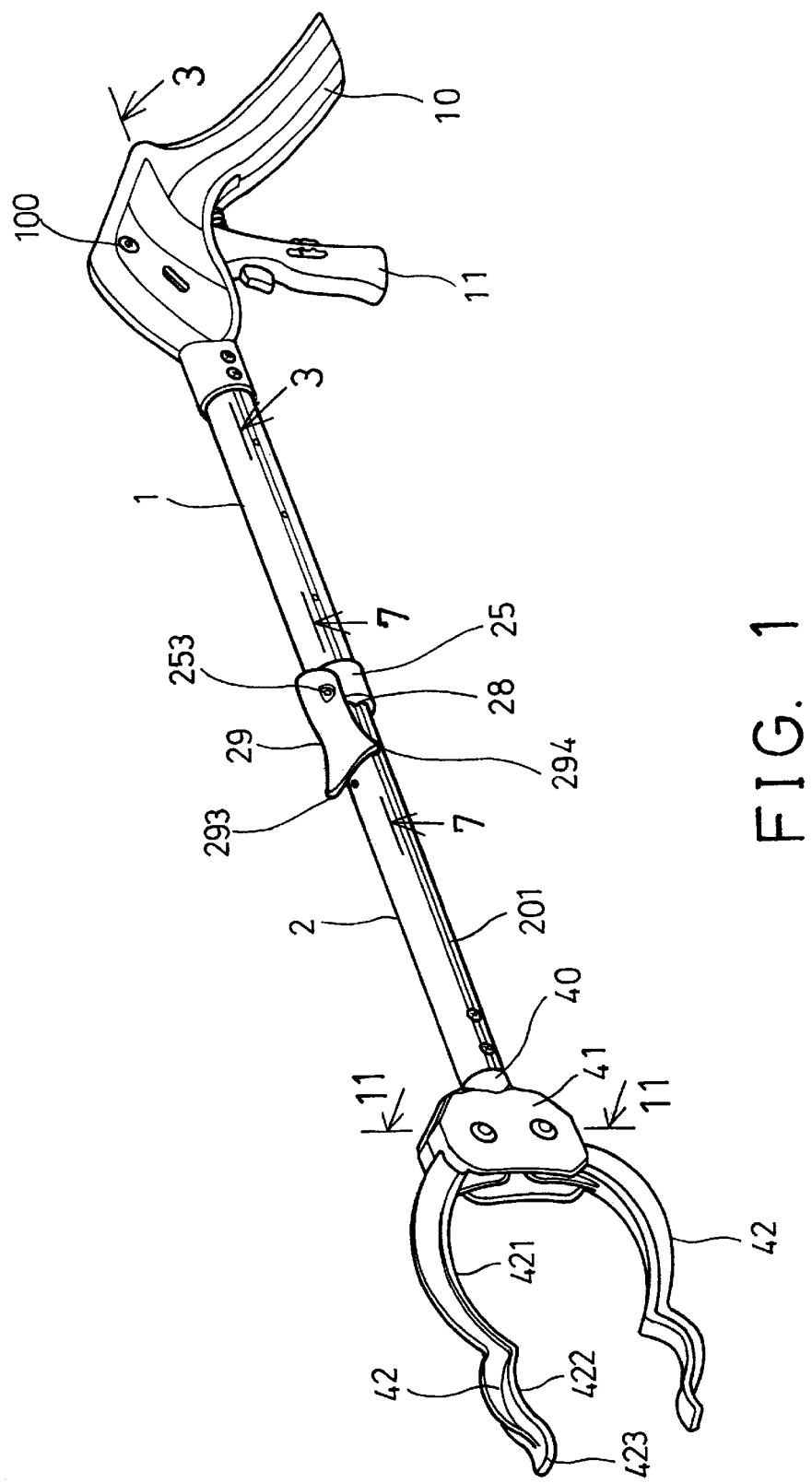
FIG. 1 is a perspective view of a gripping device in accordance with the present invention.
Figure 2:
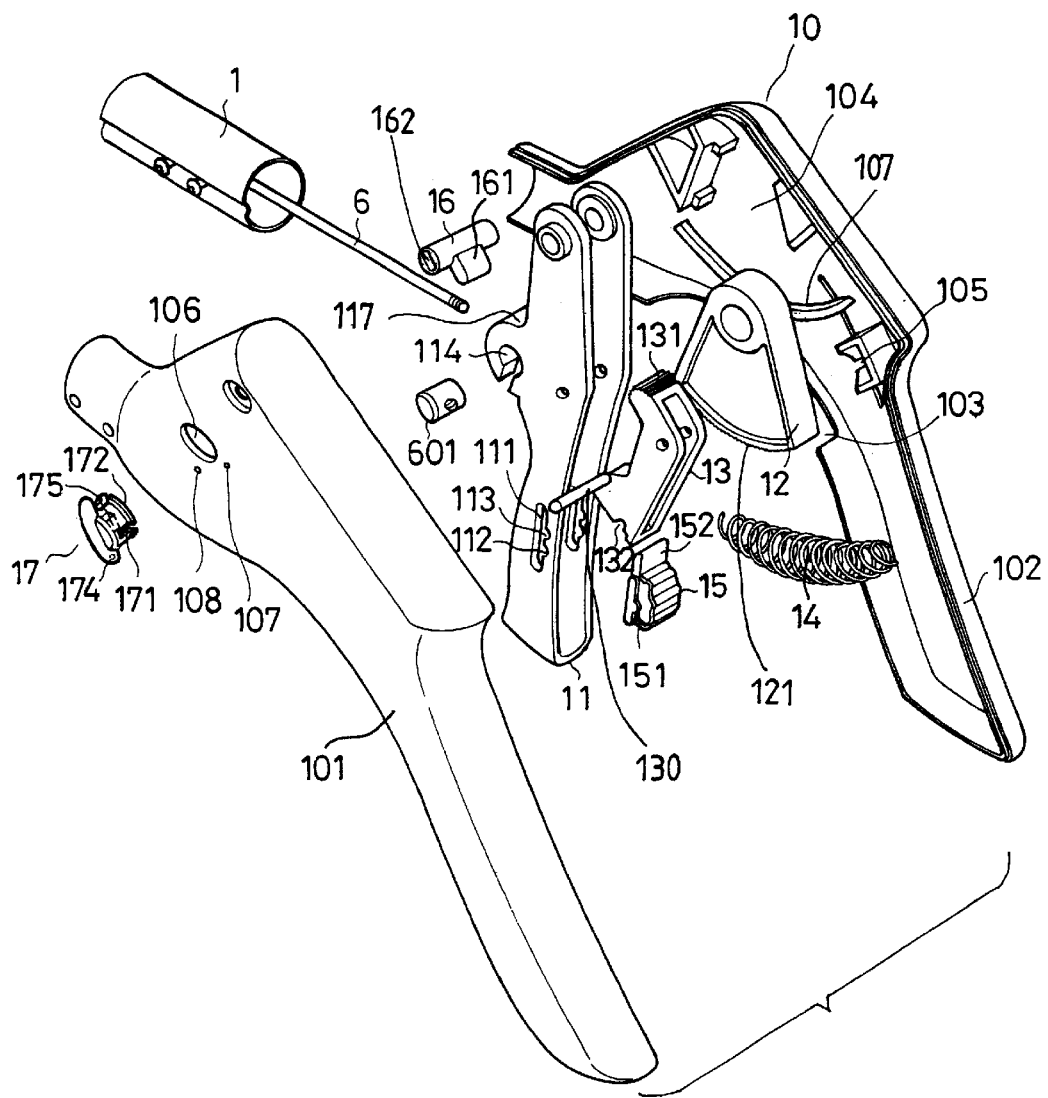
FIG. 2 is a partial exploded view of the handle portion of the gripping device.

Referring to the drawings, and initially to FIGS. 1–5, a gripping device in accordance with the present invention comprises a handle body 10 including such as two handle members 101, 102 secured together by fasteners, and/or with adhesive materials, or by welding processes. The handle body 10 includes a space 104 formed in the upper portion thereof and formed or defined by a peripheral wall 107.

A sector gear 12 is received in the space 104 of the handle body 10 and retained in the peripheral wall 107 and and secured to the handle body 10 with the fastener or the shaft 100 or the like, and includes a number of teeth 121 formed or provided in the bottom portion thereof. The handle body 10 includes an opening 103 formed in the middle portion thereof and located below the sector gear 12.

A hand grip 11 has an upper portion extended inward of the handle body 10 through the opening 103 of the handle body 10, and pivotally or rotatably secured to the handle body 10 with the shaft 100, such that the hand grip 11 may be moved toward and away from the handle body 10 about the shaft 100.

The handle body 10 has a front portion secured to one end of a tube 1. A longitudinal member, such as a longitudinal cable 6 or a wire or the like is received in the tube 1, and has a stop 601 secured to one end thereof. The hand grip 11 includes a socket opening 114 formed in the middle portion thereof for receiving the stop 601 and for coupling the cable 6 to the hand grip 11, such that the cable 6 may be moved toward and away from the handle body 10 by the hand grip 11.

A pawl 13 has a middle portion rotatably or pivotally secured to the hand grip 11 with a pivot pin 130, and includes one or more teeth or ratchet teeth 131 formed on the upper portion thereof for engaging with the sector gear 12 (FIGS. 3, 5), and for preventing the hand grip 11 from moving away from the handle body 10 and for allowing the hand grip 11 to move toward the handle body 10 only when the teeth 131 are engaged with the sector gear 12. A spring 14 is engaged between a seat 105 of the handle body 10 and the pawl 13 for biasing the teeth 131 of the pawl 13 to engage with the sector gear 12.

Figure 3:
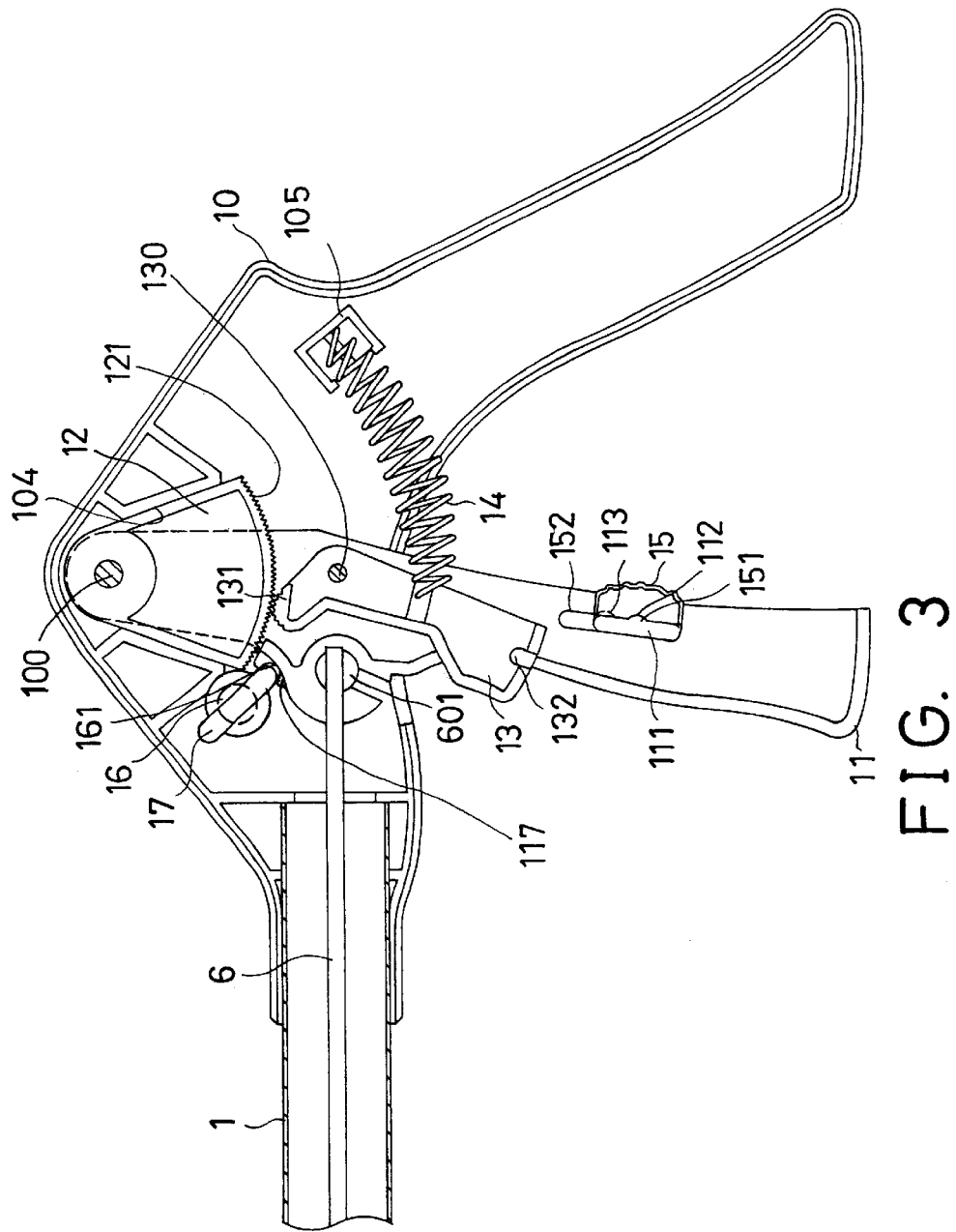
FIG. 3 is a partial cross sectional view taken along lines 3—3 of FIG. 1.
Figure 4:
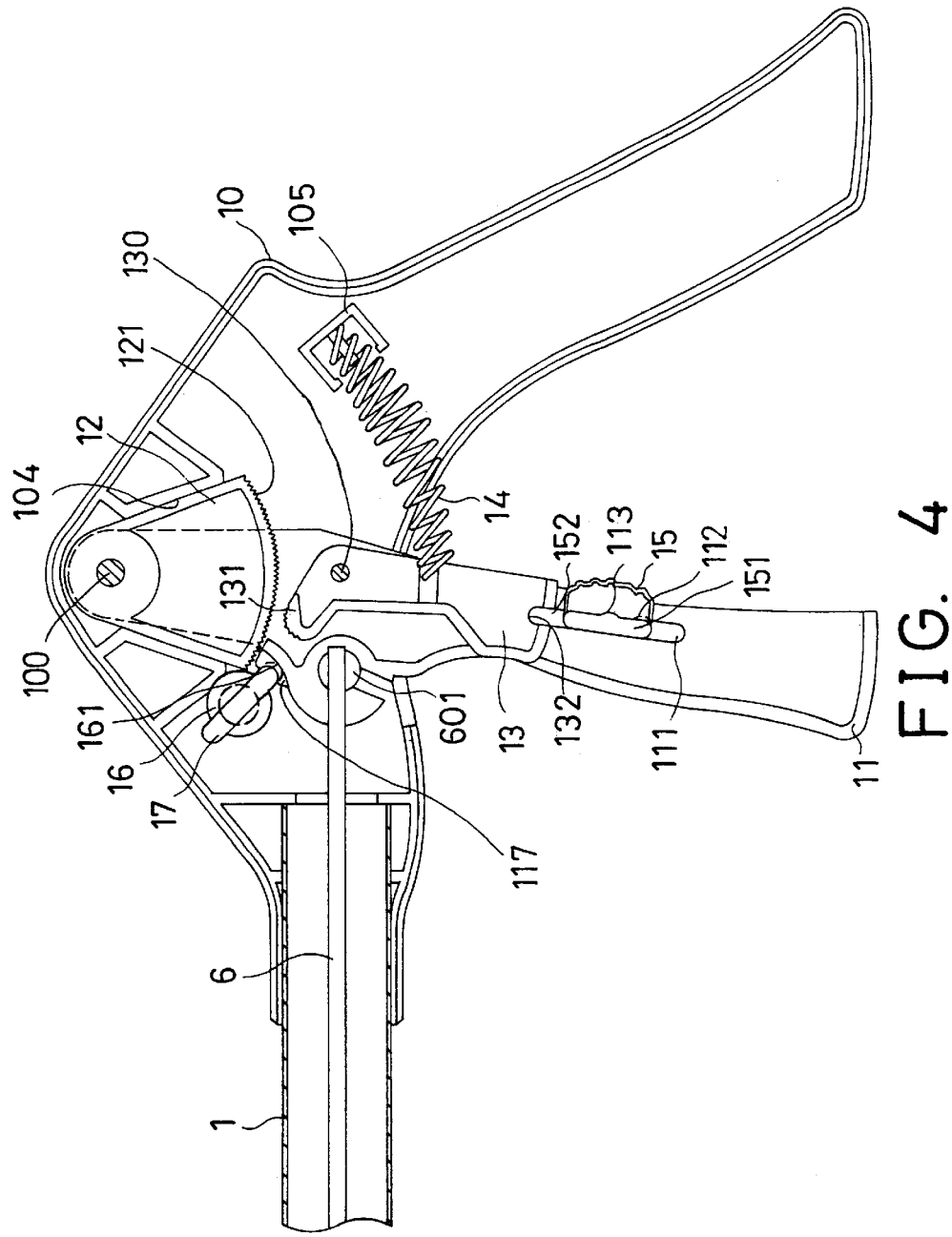
FIGS. 4, 5 are partial cross sectional views similar to FIG. 3, illustrating the operation of the gripping device.
Figure 5:
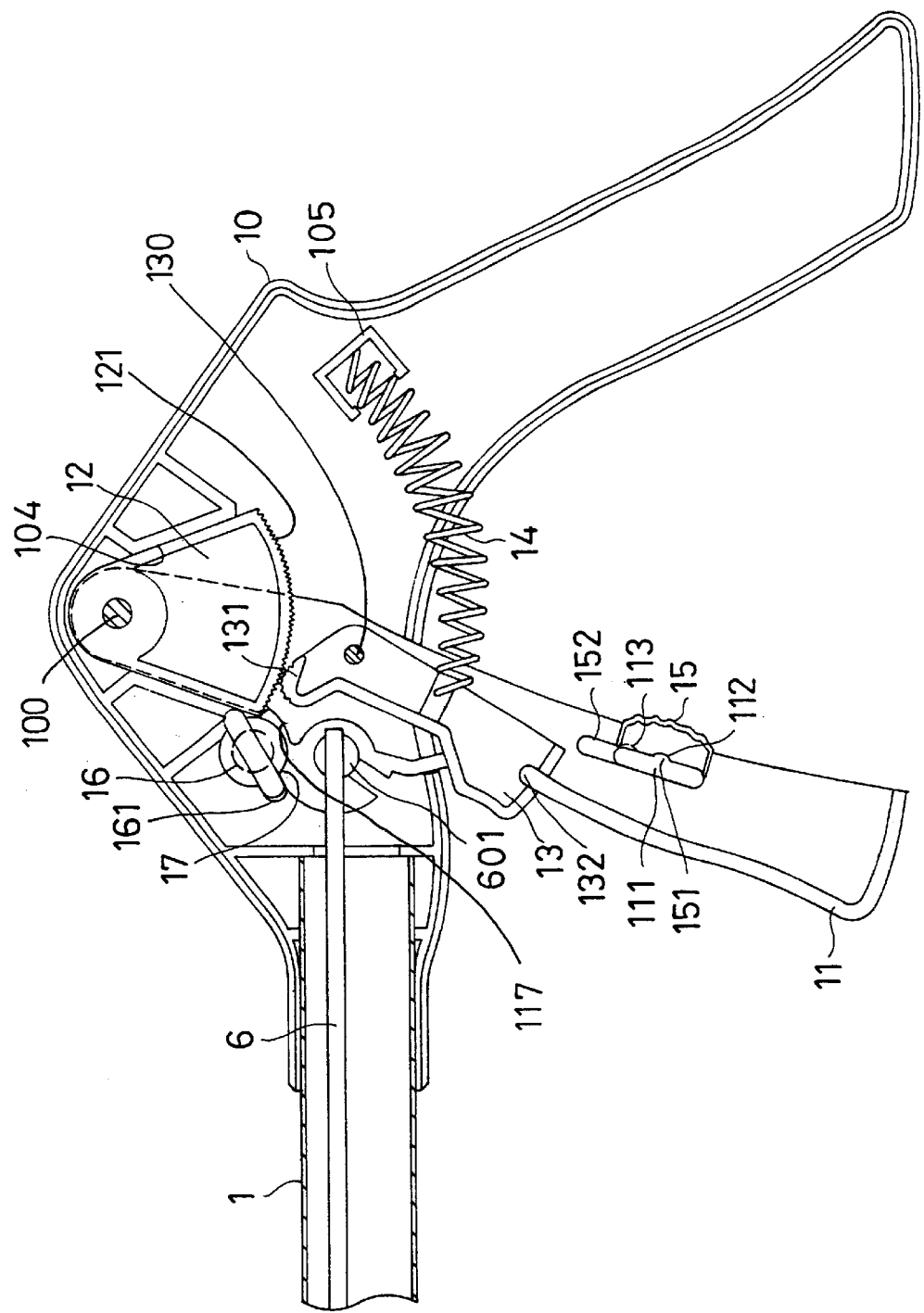
Figure 6:
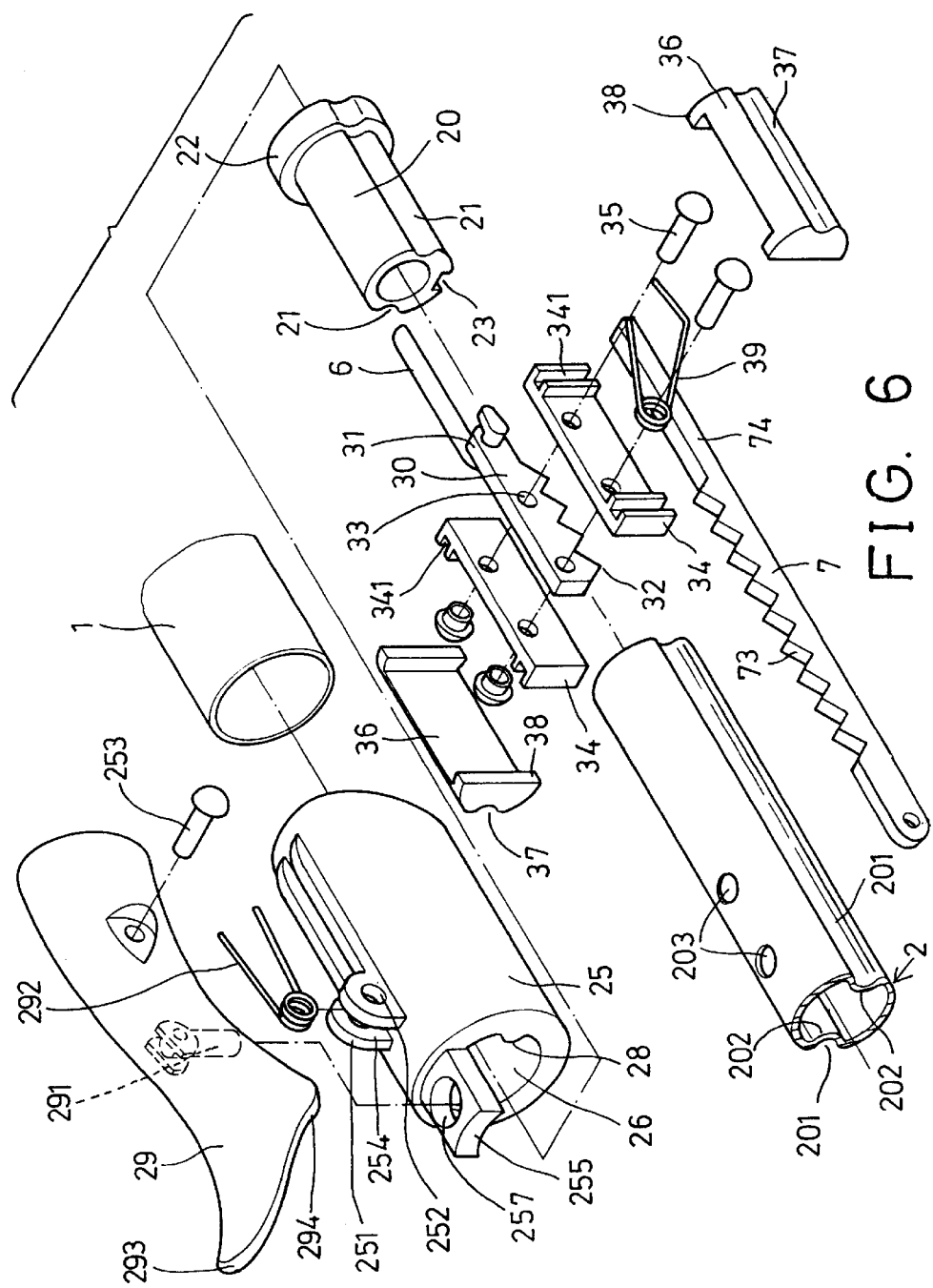
FIG. 6 is a partial exploded view of the longitudinal body portion of the gripping device.

As best shown in FIGS. 3–5, the pawl 13 includes a lower portion extended forward or outward of the hand grip 11 when biased by the spring 14, such that the lower portion of the pawl 13 may be moved inward of the hand grip 11 against the spring 14 (FIG. 4), in order to disengage the teeth 131 of the pawl 13 from the sector gear 12.

The hand grip 11 may thus be freely moved toward and away from the handle body 10 when the teeth 131 of the pawl 13 are disengaged from the sector gear 12 and when the lower portion of the pawl 13 has been moved inward of the hand grip 11 against the spring 14.

The pawl 13 includes a lock notch 132 formed in the lower portion thereof. The hand grip 11 includes one or more channels 111 formed in the middle or lower portion thereof, and includes two depressions 112, 113 formed therein and communicating with each of the channels 111 thereof.

A button 15 is slidably engaged in the channels 111 of the hand grip 11, and includes a tongue 152 for engaging into the lock notch 132 of the pawl 13 and for securing the pawl 13 to the hand grip 11, and includes one or more protrusions 151 extended laterally therefrom for engaging with either of the depressions 112, 113 of the hand grip 11 and for securing or maintaining the button 15 relative to the pawl 13.

For example, as shown in FIG. 4, when the tongue 152 of the button 15 is moved and engaged into the lock notch 132 of the pawl 13, the pawl may be secured to the hand grip 11, and the teeth 131 of the pawl 13 may thus be disengaged from the sector gear 12, such that the hand grip 11 may thus be freely moved toward and away from the handle body 10.

At this moment, the protrusion(s) 151 of the button 15 are engaged with the depression(s) 113 of the hand grip 11, in order to maintain the engagement of the tongue 152 of the button 15 in the lock notch 132 of the pawl 13. The protrusion(s) 151 of the button 15 may be engaged with the other depression(s) 112 of the hand grip 11 when the tongue 152 of the button 15 are disengaged from the lock notch 132 of the pawl 13.

The hand grip 11 includes a seat 117 formed or provided in the middle or upper portion thereof. A rod 16 is rotatably secured in the handle body 10 and includes an extension 161 extended therefrom, for engaging with the seat 117 of the hand grip 11 (FIGS. 3, 4), in order to limit the forward movement of the hand grip 11 relative to the handle body 10.

A knob 17 has a shank 171 rotatably secured in an aperture 106 of the handle body 10 and has a peripheral flange 172 for engaging with the handle body 10 and for rotatably securing the shank 171 of the knob 17 to the handle body 10. The knob 17 includes a jut 175 extended therefrom and engaged into a recess 162 of the rod 16 (FIG. 2), such that the rod 16 may be rotated by the knob 17, and such that the extension 161 of the rod 16 may be rotated, by the knob 17, to engage with the seat 117 of the handle body 10 or to be disengaged from the handle body 10.

The knob 17 includes a projection 174 extended therefrom for engaging with either of two holes 107, 108 of the handle body 10 and for positioning the knob 17 and the rod 16 to the handle body 10, and for maintaining the extension 161 of the rod 16 in either engagement with (FIGS. 3, 4) or disengaging from the handle body 10 (FIG. 5).

Referring next to FIGS. 1 and 6–9, a pipe 2 includes one or more, such as two longitudinal grooves 201 formed therein and each defined by a swelling 202 (FIG. 6) that is inwardly extended into the pipe 2, and one or more cavities 203 formed therein, preferably offset from the grooves 201 thereof.

A cap 20 includes a diameter for engaging into the rear end of the pipe 2 (FIGS. 8, 9) and secured to the pipe 2 with such as a force-fitted engagement, or with adhesive materials, or by welding processes, such that the cap 20 may be solidly secured to the pipe 2 and may be slidably engaged into the tube 1 (FIGS. 8, 9) for adjusting the relative position between the tube 1 and the pipe 2.

The cap 20 includes one or more, such as two recesses 21 formed therein for receiving the respective swellings 202 of the pipe 2 and for preventing the cap 20 from rotating relative to the pipe 2. The cap 20 further includes a channel 23 formed therein, preferably formed in the bottom portion thereof and preferably parallel to the recesses 21 thereof.

The cap 20 includes a rear portion having an enlarged head or peripheral flange 22 formed thereon or extended therefrom for engaging with the pipe 2, and for limiting the relative movement between the cap 20 and the pipe 2, and for preventing the cap 20 from deeply engaging into the pipe 2.

A barrel 25 includes a bore 26 formed therein and having a rear portion for receiving the front region of the tube 1 and secured to the tube 1 with such as a force-fitted engagement, or with adhesive materials, or by welding processes such that the barrel 25 moves in concert with the tube 1.

Figure 8:
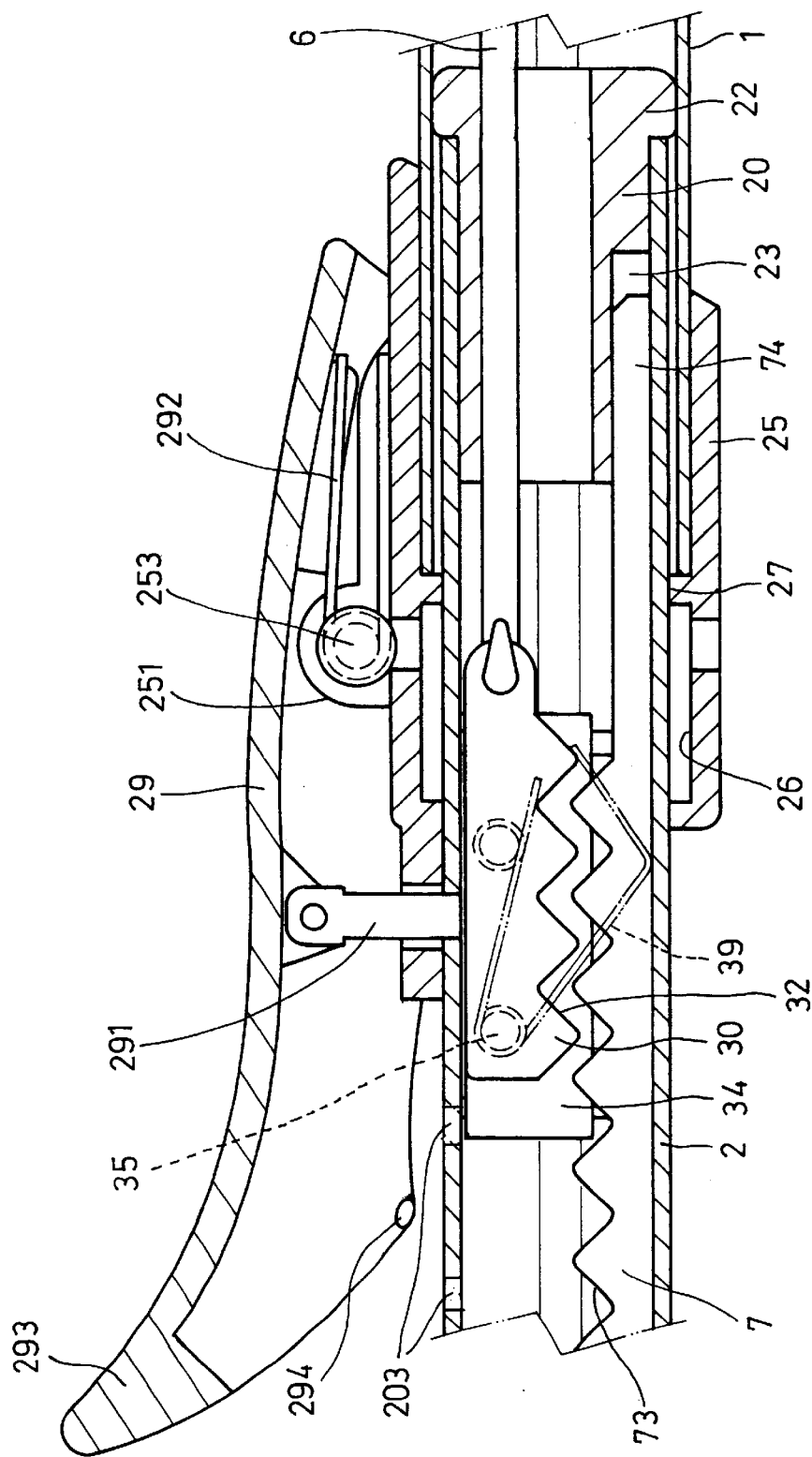
FIG. 8 is a partial cross sectional view similar to FIG. 7, illustrating the operation of the gripping device.

As best shown in FIGS. 8. and 9, the barrel 25 includes a peripheral rib 27 radially extended into the middle portion of the barrel 25 and engaged with the front end of the tube 1, for limiting the engagement of the tube 1 into the bore 26 of the barrel 25, and for solidly securing the barrel 25 onto the front end of the tube 1.

The barrel 25 includes one or more, such as two swellings 28 (FIG. 6) that are extended into the barrel 25 for slidably engaging into the grooves 201 of the pipe 2, and for guiding the barrel 25 to move relative to the pipe 2 and for preventing the barrel 25 from rotating relative to the pipe 2.

The barrel 25 includes a pair of ears 251 extended therefrom and each having a hole 252 formed therein for receiving an axle 253 therein, and a passage 254 formed therein and located between the ears 251. The barrel 25 includes an extension 255, such as extended forwardly therefrom, and having an orifice 257 formed therein.

A lever 29 has one end region, such as the rear portion thereof rotatably engaged on the axle 253, and may thus be rotatably secured to the barrel 25 with the axle 253, and includes a catch 291 extended therefrom, such as extended downwardly from the middle portion thereof, and slidably engaged through the orifice 257 of the barrel 25. The lever 29 may also be directly attached to the tube 1.

Figure 9:
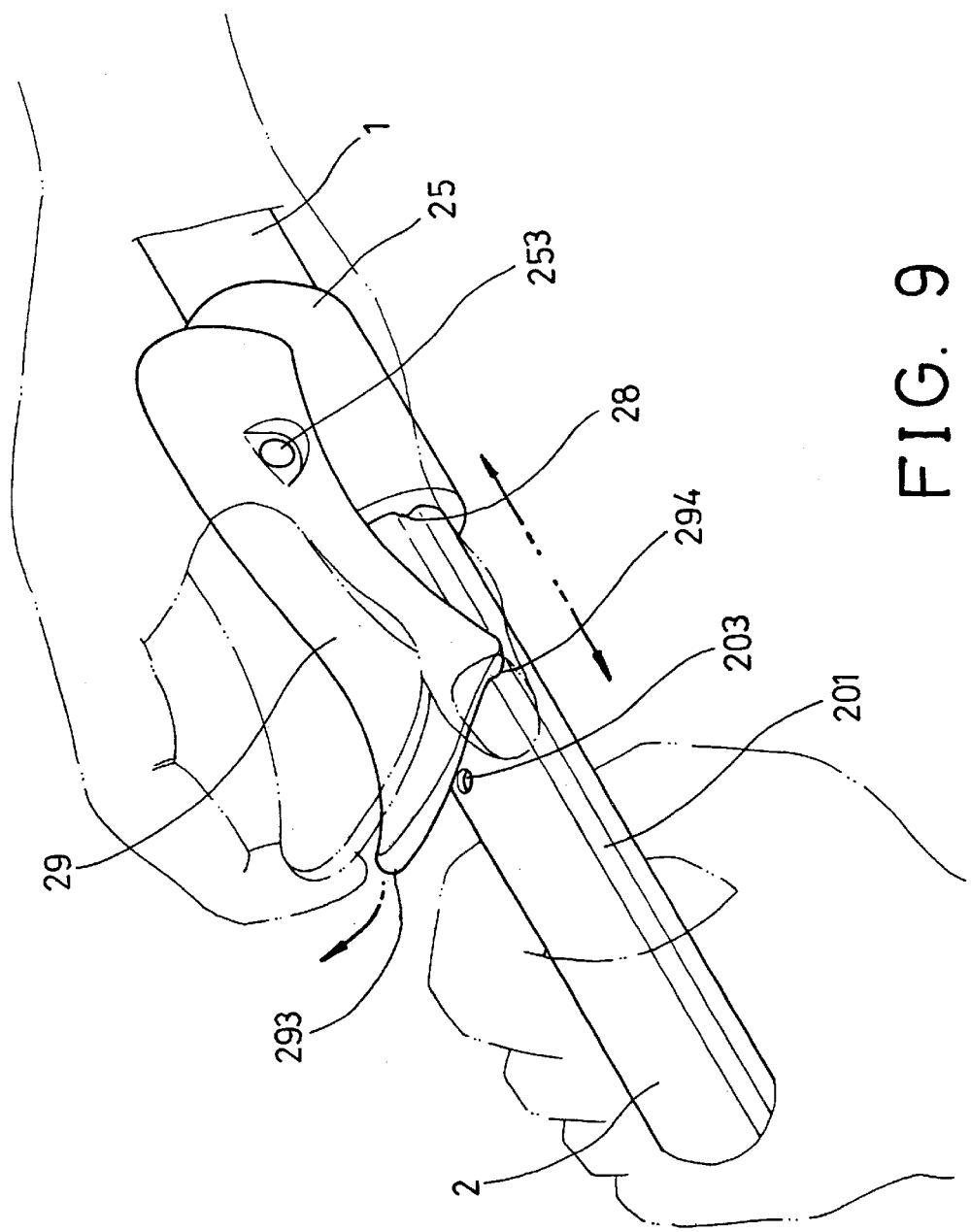
FIG. 9 is a partial perspective view illustrating the operation of the gripping device.
Figure 10:
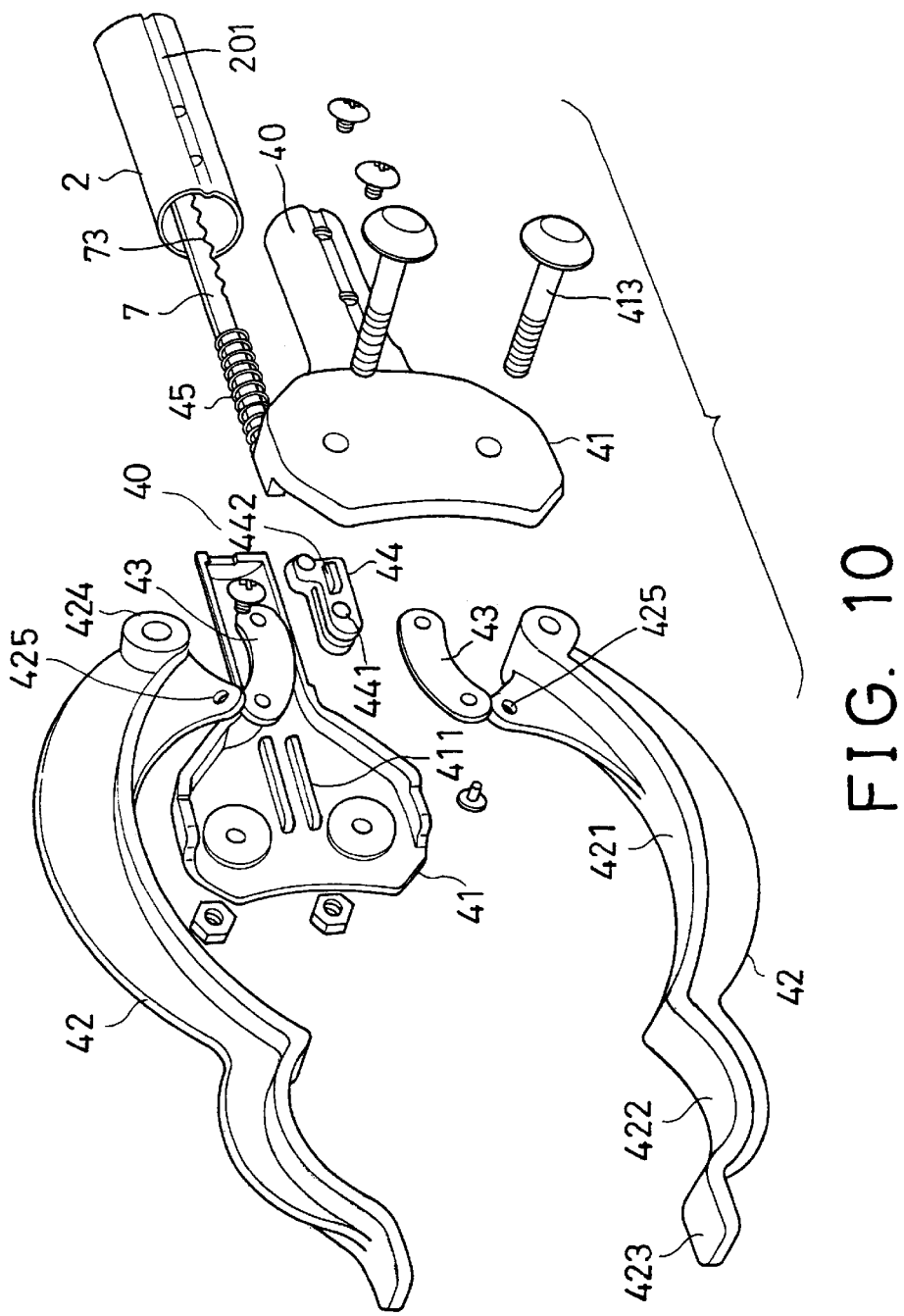
FIG. 10 is a partial exploded view of the gripping portion of the gripping device.
Figure 11:
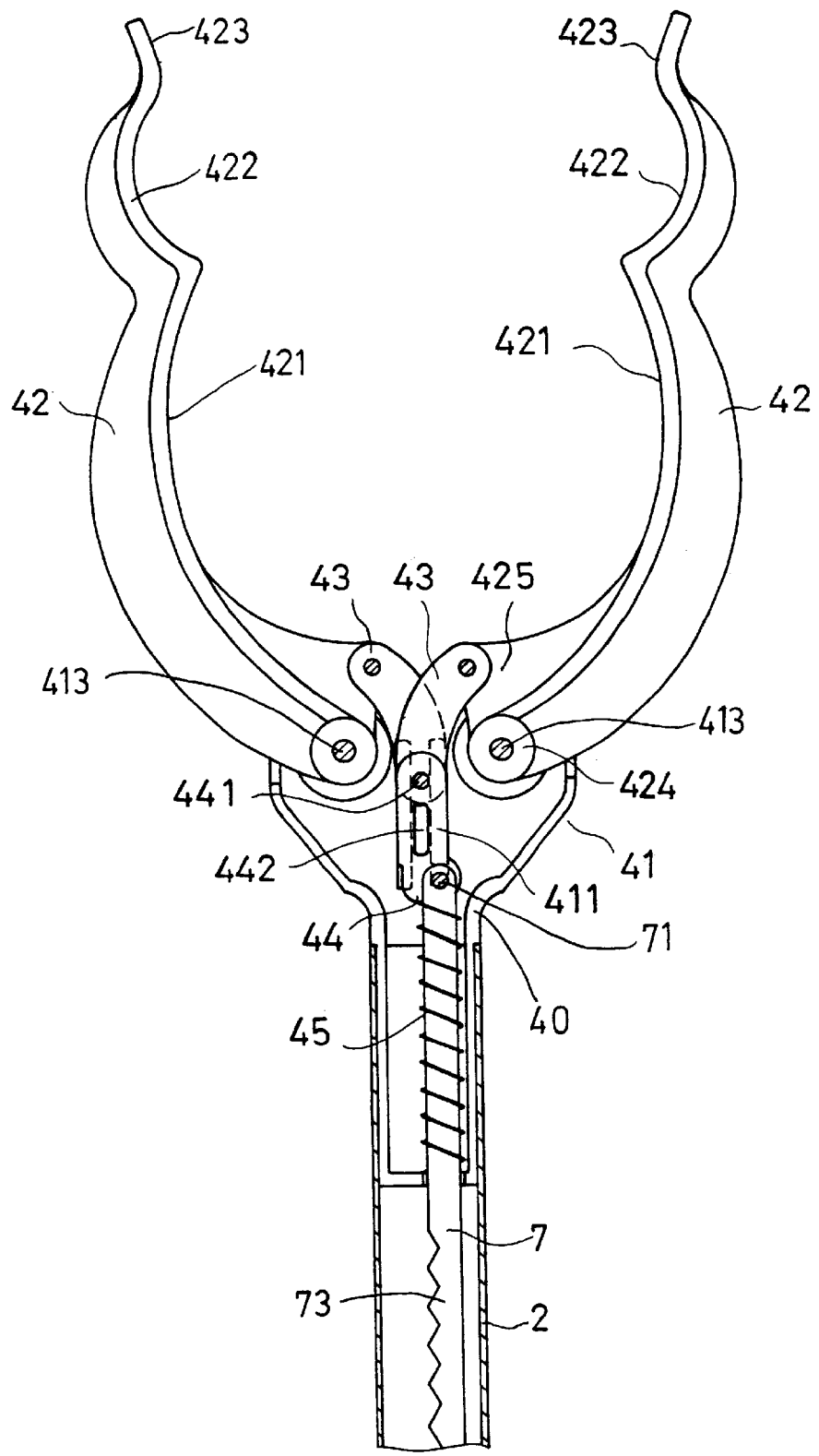
FIG. 11 is a partial cross sectional view taken along lines 11—11 of FIG. 1.
Figure 12:
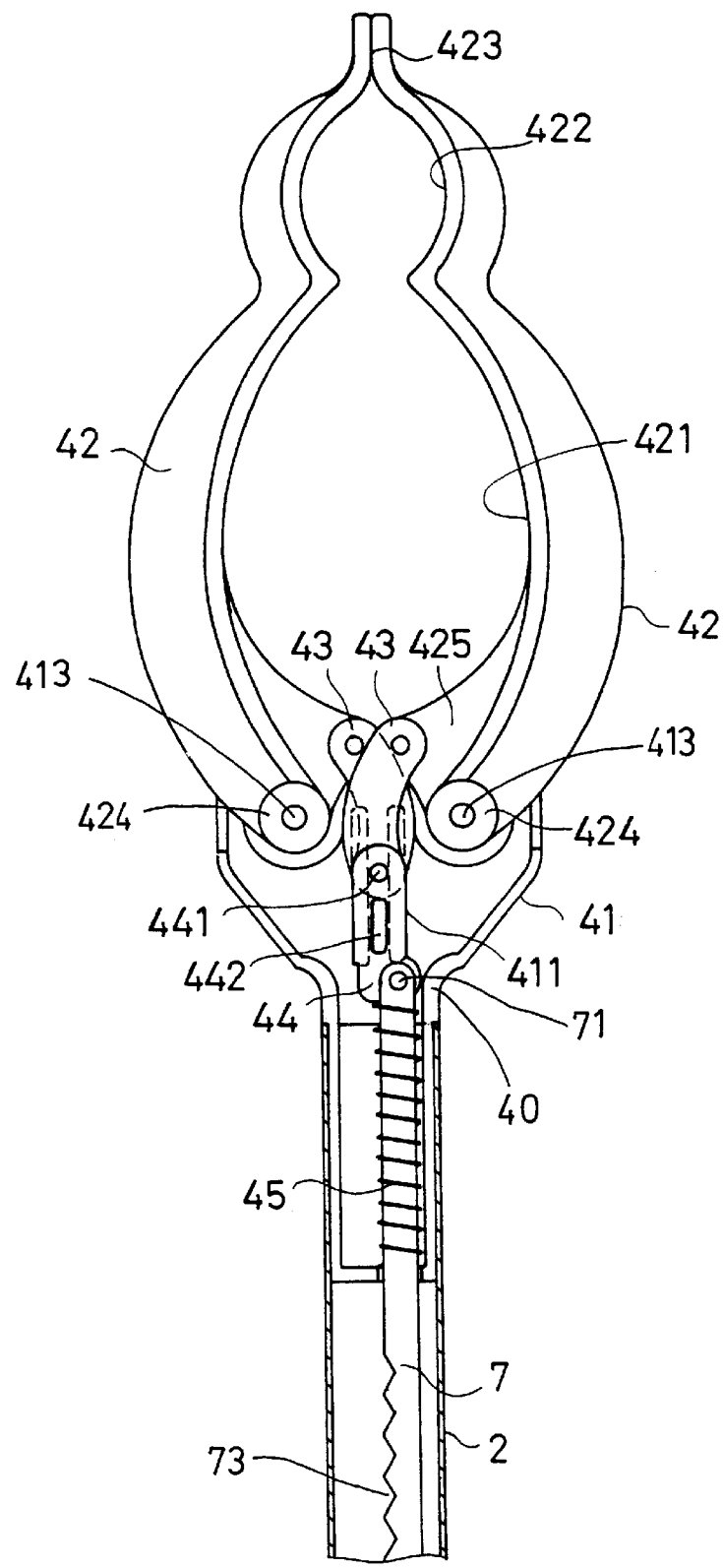
FIG. 12 is a partial cross sectional view similar to FIG. 11, illustrating the operation of the gripping device.

As best shown in FIGS. 8, 9, the catch 291 of the lever 29 may be engaged into either of the cavities 203 of the pipe 2 for adjustably securing the tube 1 to the pipe 2, and for allowing the tube 1 to be moved or adjusted relative to the pipe 2 when the catch 291 of the lever 29 is disengaged from the pipe 2.

A spring 292 is engaged on the axle 253, and is engaged between the barrel 25 and the lever 29, for biasing and for engaging the catch 291 of the lever 29 into either of the cavities 203 of the pipe 2, and thus for adjustably securing the tube 1 to the pipe 2.

As shown in FIG. 8, the other end or the front end region 293 of the lever 29 may be moved or pulled away from the pipe 2 against the spring 292, in order to disengage the catch 291 of the lever 29 from the pipe 2, and for allowing the pipe 2 to be moved and adjusted relative to the tube 1.

The lever 29 includes one or more, such as two projections 294 provided in the front end region 293 thereof for engaging with the grooves 201 of the pipe 2 and for positioning the lever 29 to the pipe 2, and for preventing the front end region 293 of the lever 29 from being easily moved away from the pipe 2 inadvertently.

Referring next to FIGS. 1 and 10–12, a base 40 is secured to the front end of the pipe 2 with such as fasteners or the like, and includes a pair of flaps 41 extended therefrom. A tool member 42, such as a pair of gripping fingers 42, may be attached to the pipe and to be coupled to and actuated or operated by the hand grip 11.

For example, the tool member or the gripping fingers 42 each includes a rear end 424 pivotally or rotatably secured to the flaps 41 with pivot poles 413 respectively, and each includes one or more curved recesses 421, 422, 423 formed therein and having different curvatures for holding or grasping or gripping objects of different diameters.

The flaps 41 each includes a channel or a track 411 (FIG. 10) or the like formed therein. A follower 44 has two ears 442 extended therefrom and slidably engaged in the tracks 411 of the flaps 41 for guiding the follower 44 to move forward and rearward relative to the flaps 41.

A pair of links 43 have a rear end pivotally or rotatably secured to the front end of the follower 44 with a pivot pin 441, and each has a front end pivotally secured to a lateral extension 425 of the respective gripping fingers 42, such that the gripping fingers 42 may be caused to rotate or to move toward each other (FIG. 12) or to be moved away from each other (FIG. 11) when the follower 44 is moved along the tracks 411 of the flaps 41.

A beam 7 is slidably received in the pipe 2 and has a front end secured to the follower 44 with a fastener 71 or the like, such that the movement of the beam 7 in the pipe 2 may cause the gripping fingers 42 to grasp or to grip the objects or to release the objects. The beam 7 includes a number of teeth 73 formed thereon, preferably the ratchet teeth or the like.

A spring 45 is engaged on the beam 7 and engaged between the base 40 and the follower 44 for moving the follower 44 forward and for forcing the gripping fingers 42 to move away from each other (FIG. 11), and for allowing the gripping fingers 42 to be easily engaged onto the objects.

Referring again to FIGS. 6–8, the beam 7 includes one end, such as the rear end 74 thereof slidably engaged in the channel 23 of the cap 20, for guiding the beam 7 to move longitudinally along the pipe 2 and for preventing the beam 7 from rotating relative to the pipe 2.

A bar 30 is slidably received in the pipe 2, and includes one end, such as the rear end 31 thereof coupled to the front end of the cable 6 such that the bar 30 may be moved forward and rearward along the pipe 2 by the cable 6 and thus by the hand grip 11.

The bar 30 includes one or more teeth, such as ratchet teeth 32 or the like formed thereon for engaging with the teeth 73 of the beam 7 (FIG. 7), and for allowing the beam 7 to be moved by the bar 30 and the cable 6, in order to actuate or operate the gripping fingers 42. The bar 30 further includes one or more apertures 33 formed therein.

One or more, such as two boards 34 are secured to the bar 30 with one or more fasteners 35 that may be engaged through the apertures 33 of the bar 30. The boards 34 each includes one or more, such as two channels or tracks 341 formed therein and facing away from the bar 30.

One or more, such as two stops 36 are received in the pipe 2 and each includes a depression 37 formed in the outer peripheral portion thereof for slidably receiving the swellings 202 of the pipe 2 and for guiding the stops 36 to move along the pipe 2, and for preventing the stops 36 from rotating relative to the pipe 2.

The stops 36 each includes one or more, such as two juts 38 extended therefrom and slidably engaged in the tracks 341 of the boards 34 respectively, for guiding the bar 30 to move up and down or to move toward or away from the beam 7, and thus for guiding the teeth 32 of the bar 30 to be moved toward and away from the teeth 73 of the beam 7.

A spring 39 may further be provided and may be engaged onto one of the fasteners 35, and may be engaged between the pipe 2 and the board 34 or the bar 30, for biasing and disengaging the teeth 32 of the bar 30 from the teeth 73 of the beam 7. The spring 292 has a spring biasing force greater than that of the spring 39, for allowing the catch 291 to force the bar 30 toward the beam 7 against the spring 292.

Figure 7:
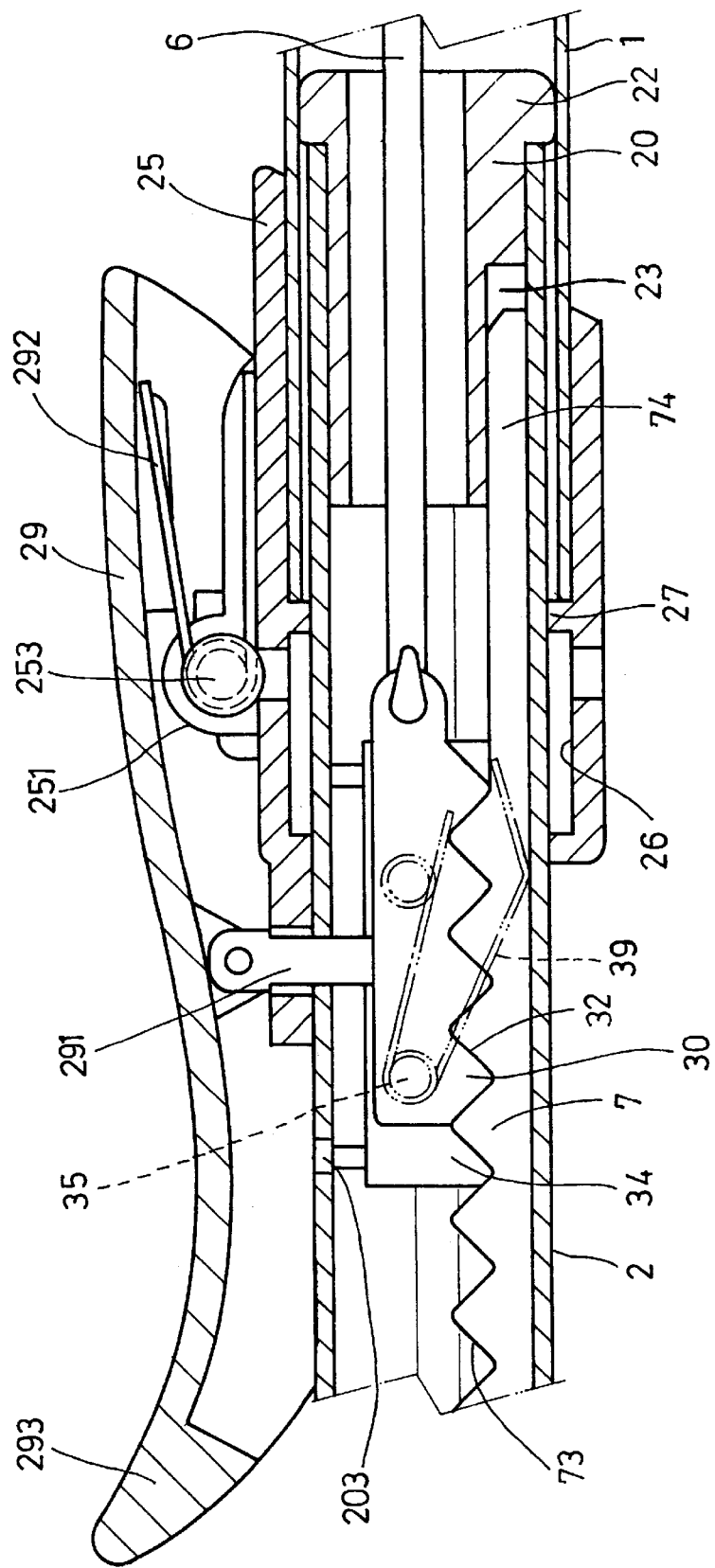
FIG. 7 is a partial cross sectional view taken along lines 7—7 of FIG. 1.

In operation, as shown in FIG. 7, the spring 292 may bias and actuate the catch 291 to force the teeth 32 of the bar 30 to engage with the teeth 73 of the beam 7, against the spring 39, such that the tool member or the gripping fingers 42 may be actuated by the hand grip 11 via the cable 6 and the bar 30 and the beam 7. The curved recesses 421, 422, 423 of different curvatures and of the gripping fingers 42 may be used for holding or grasping or gripping objects of different diameters.

As shown in FIG. 3, when the hand grip 11 is pulled toward the handle body 10 in order to pull the cable 6 rearward toward the handle body 10, the teeth 131 of the pawl 13 may be forced to engage with the sector gear 12, in order to prevent the hand grip 11 from moving away from the handle body 10.

The objects or the work pieces may thus be solidly held in or by the gripping fingers 42 even when the hand grip 11 is released. Accordingly, the users may release the hand grip 11 after the gripping fingers 42 has grasped the objects that are required to be grasped and moved by the gripping device.

As shown in FIG. 4, when the pawl 13 is moved inward of the hand grip 11 against the spring 14, the teeth 131 of the pawl 13 may be disengaged from the sector gear 12, such that the hand grip 11 is released and may be pulled toward and away from the handle body 10 freely. The tongue 152 of the button 15 may be engaged into the lock notch 132 of the pawl 13 in order to lock the pawl 13 to the hand grip 11, and in order to release the hand grip 11 relative to the handle body 10.

As shown in FIGS. 3, 4, the extension 161 of the rod 16 may be engaged with the seat 117 of the hand grip 11 in order to limit the forward movement of the hand grip 11 relative to the handle body 10. As shown in FIG. 5, when the extension 161 of the rod 16 may be rotated or disengaged from the seat 117 of the hand grip 11 for allowing the hand grip 11 to further rotated or slightly move forward or away from the handle body 10.

When the bar 30 is disengaged from the beam 7, and when the catch 291 of the lever 29 is moved or pulled away from the pipe 2, the barrel 25 and the tube 1 and the bar 30 may be moved relative to the beam 7 and the pipe 2, in order to adjust the tube 1 relative to the pipe 2 to any suitable relative position.

Accordingly, the gripping fingers 42 and the pipe 2 may be adjusted and moved toward or away from the handle body 10. When the extension 161 of the rod 16 is rotated and caused to engage with the seat 117 of the hand grip 11 again, the hand grip 11 may be slightly moved rearward or toward the handle body 10, or slightly moved away from the gripping fingers 42.

The teeth 32 of the bar 30 may be moved or forced to engage with the teeth 73 of the beam 7 again in order to couple the bar 30 and the cable 6 and the beam 7 together, and for allowing the gripping fingers 42 to be actuated by the hand grip 11 via the cable 6 again. The catch 291 of the lever 29 may be forced to engage into either of the cavities 203 of the pipe 2 again by the lever 29 after the tube 1 has been adjusted relative to the pipe 2.

Accordingly, the gripping device in accordance with the present invention includes an adjustable configuration for adjusting to different lengths and to grasp or grip objects in deep holes.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A gripping device comprising:
   a handle body,
   a hand grip rotatably secured to said handle body with a shaft, and rotatable toward and away from said handle body about said shaft,
   a tube secured to said handle body,
   a pipe,
   a tool member coupled to said pipe,
   a beam slidably received in said pipe, and coupled to said tool member,
   a cable secured to said hand grip,
   a bar coupled to said cable,
   means for adjustably securing said tube to said pipe, and
   means for detachably securing said bar and said cable to said beam and said tool member.

2. The gripping device according to claim 1, wherein said beam includes at least one tooth provided thereon, said bar includes at least one tooth provided thereon for selectively engaging with said at least one tooth of said beam and for detachably securing said bar to said beam.

3. The gripping device according to claim 1, wherein said tool member includes a base secured to said pipe, a pair of gripping fingers pivotally to said base and rotatable toward and away from each other, and means for coupling said gripping fingers to said beam.

4. The gripping device according to claim 3, wherein said coupling means includes a follower slidably received in said base and secured to said beam, and a pair of links pivotally coupling said follower to said gripping fingers respectively.

5. The gripping device according to claim 3 further comprising means for locking said hand grip to said handle body to prevent said hand grip from rotating away from said handle body when said gripping fingers grasp the object.

6. The gripping device according to claim 1, wherein said tube includes a first end, said pipe includes a first end to be detachably secured to said first end of said tube, said adjustably securing means includes a barrel secured to said first end of said tube, and means for catching said barrel to said pipe.

7. The gripping device according to claim 6, wherein said catching means includes a lever pivotally secured to said barrel, and including a catch extended therefrom for selectively engaging through said barrel and said pipe.

8. The gripping device according to claim 7, wherein said pipe includes a plurality of cavities formed therein, said barrel includes an orifice formed therein, said catch of said lever is engaged through said orifice of said barrel, and selectively engaging into either of said cavities of said pipe.

9. The gripping device according to claim 1, wherein said tube includes a first end, said pipe includes a first end to be detachably secured to said first end of said tube, said detachably securing means includes a catch slidably attached to said first end of said tube and engageable through said cavity of said pipe, and engageable with said bar, for selectively forcing said bar toward and to engage with said beam.

10. The gripping device according to claim 9 further comprising means for biasing said catch to engage into said pipe and to engage with said bar.

11. The gripping device according to claim 9, wherein said detachably securing means includes a lever pivotally secured to said tube and having said catch extended therefrom for engaging through said pipe.

12. The gripping device according to claim 11, wherein said lever includes at least one projection provided thereon and engageable with said pipe, for positioning said lever to said pipe.

13. The gripping device according to claim 1 further comprising means for guiding said bar to move toward and away from said beam.

14. The gripping device according to claim 13, wherein said guiding means includes at least one stop received in said pipe and having at least one jut extended therefrom, at least one board secured to said bar and having at least one track provided therein for slidably receiving said at least one jut, and for slidably guiding said at least one board and said bar to move relative to said pipe and said beam.

15. The gripping device according to claim 1 further comprising means for biasing said bar away from said beam.

16. The gripping device according to claim 1, wherein said pipe includes at least one swelling provided thereon, and a cap attached to said pipe and having at least one recess formed therein for receiving said at least one swelling and for preventing said cap from rotating relative to said pipe.

17. The gripping device according to claim 16, wherein said cap includes a channel formed therein for slidably receiving said beam and for guiding said beam to move relative to said pipe and for preventing said beam from rotating relative to said pipe.

* * * * *